United States Patent

[11] 3,590,266

[72] Inventors Wilbur D. Johnston, Jr.
Middletown;
Ivan P. Kaminow, New Shrewsbury, both of, N.J.
[21] Appl. No. 728,302
[22] Filed May 10, 1968
[45] Patented June 29, 1971
[73] Assignee Bell Telephone Laboratories, Incorporated
Murray Hill, Berkeley Heights, N.J.

[54] RAMAN OSCILLATOR EMPLOYING RARE ISOTOPE
3 Claims, 4 Drawing Figs.
[52] U.S. Cl.................................................. 307/88.3, 321/69, 330/4.5, 331/107
[51] Int. Cl...................................................... H03f 7/00
[50] Field of Search......................................... 307/88.3; 321/69; 331/107

Primary Examiner—Roy Lake
Assistant Examiner—Darwin R. Hostetter
Attorneys—R. J. Guenther and Arthur J. Torsiglieri ABSTRACT: The Raman oscillators disclosed employ $Li^6NbO_3$ to provide an oscillation threshold that is substantially lower than for the common $Li^7NbO_3$. These oscillators can be tuned by variation of environmental temperature or electric field. In one embodiment, the frequency of oscillation is selectable by choice of a ratio of a mixture of $Li^6NbO_3$ and $Li^7NbO_3$ in the oscillator.

RAMAN OSCILLATOR EMPLOYING RARE ISOTOPE

BACKGROUND OF THE INVENTION

This invention relates to coherent light generators of the type known as Raman lasers or Raman oscillators.

Raman oscillators have potential applications in optical communication systems and laboratory instruments because of the large nonlinearities at natural resonant frequencies of the active medium, the feasibility of simple continuous tuning arrangements, and the less stringent requirements on the optical quality of the medium than the requirements for an electronic parametric oscillator.

In a Raman oscillator, an essentially monochromatic exciting radiation, hereinafter referred to as the pump radiation, is supplied to a suitable Raman-active medium to generate a coherent radiation, hereinafter referred to as Raman-shifted radiation or simply Raman radiation, which is shifted in frequency from the pump radiation frequency by an amount that is characteristic of the Raman-active medium. The frequency shift, or difference between input and output frequencies, is typically equal to the frequency of a lattice vibration called an optic phonon. An optic phonon in a medium is characterized in that adjacent atoms in the lattice move in opposite senses to one another.

To be useful in a Raman laser, the medium should have an optic phonon capable of absorbing quanta from the pump radiation and reradiating quanta at the shifted frequency without excessive other absorptions. The phonon is then said to be Raman active.

Most media employed in prior art Raman lasers are either liquids, such as benzene, nitrobenzene or toluene, or are solids such as quartz, diamond or calcite. It is also known that there is a relationship between Raman scattering cross section and electro-optic coefficient in materials having a substantial linear electro-optic effect.

We have conducted extensive investigations of such liquids and solids in order to try to find a promising candidate for a continuous wave Raman laser. Raman lasers have heretofore been operated with high-power pulsed pump radiation because of the very high thresholds for the onset of stimulated emission and for oscillation in suitable resonators. Consequently, the output coherent radiation has appeared in pulses. A Raman laser capable of providing continuous wave coherent radiation would have greatly increased utility in some types of optical communication system and for many other uses of coherent radiation. We have endeavored to find Raman active media with increased Raman scattering cross sections and reduced linewidth as compared to other solids, inasmuch as smaller stimulated emission threshold, higher gain and enhanced possibilities of continuous wave oscillation may thereby be obtained.

SUMMARY OF THE INVENTION

We have discovered a substantial enhancement of Raman scattering cross section with reduced linewidth in lithium metaniobate ($LiNbO_3$) upon the substitution of the relatively rare $Li^6$ isotope for more common $Li^7$ isotope. These findings promise enhanced gain in a Raman oscillator. In general, the crystal may include other constituents of the form $R_yMO_n$, where $MO_n$ is a compound anion of the molecule, M includes one or more oxidizable atoms, O is oxygen and R is a cation capable of combining into the molecule $R_yMO_n$, and $y$ and $n$ are combining proportions. The other constituents should form a substantially homogenous single crystal with the $Li^6NbO_3$; and the $Li_6NbO_3$ should constitute at least a mole fraction of the crystal equal to or greater than 0.05.

It is one aspect of our invention that we have also discovered that the lithium isotope substitution is apparently anomalous in that substitutions of rare isotopes in other solid Raman-active media that we have investigated have no appreciable effect on Raman scattering cross sections. Our experiments and theoretical analysis tentatively indicate that the increased gain or scattering cross section per unit linewidth appears to be produced by a decoupling of the strongest Raman-active vibration mode in $Li^6NbO_3$ from the other vibrational modes that draw energy from the corresponding Raman-active mode in $Li^7NbO_3$.

Based on our discovery of a small (for optical frequencies but very precise frequency difference of the corresponding Raman-active modes in $Li^6NbO_3$ and $Li^7NbO_3$ under like conditions, a subsidiary feature of our invention is the employment of a selected ratio of the isotopic compounds in a mixed medium thereof. A plurality of such Raman oscillators having different selected ratios may be useful in an optical communication system as sources of the respectively different carrier frequencies of different communication channels that are to be frequency multiplexed. Since the maximum frequency spacing is about 100 gigaHertz (1 gigaHertz equals $10^9$ cycles per second), a large number of television transmission or telephone communication channels could be provided by modulation of Raman oscillator carrier sources employing different mixture ratios of $Li^6NbO_3$ and $Li^7NbO_3$.

BRIEF DESCRIPTION OF THE DRAWING

Further features and advantages of our invention will become apparent from the following detailed description, taken together with the drawing, in which:

FIG. 2A is a table showing vibrational frequency data on the pertinent Raman-active modes in $Li^6NbO_3$ and $Li^7NbO_3$.

DESCRIPTION OF ILLUSTRATIVE EMBODIMENT

Figure 1:
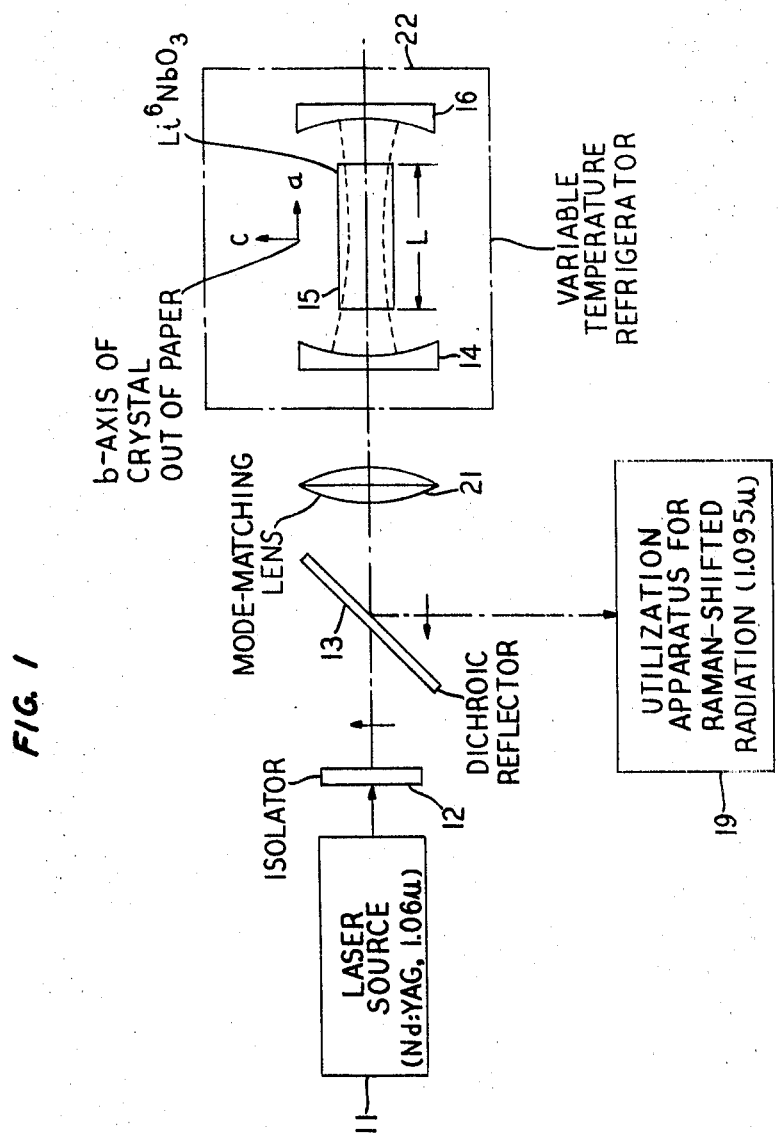
FIG. 1 is a partially pictorial and partially block diagrammatic illustration of a first embodiment of our invention.

In the illustrative embodiment of FIG. 1, monochromatic pumping radiation at 1.06 from a $Nd^{3+}$: YAG laser 11 is to be converted to coherent radiation at another wavelength, illustratively $1.095\mu$ by means of stimulated Raman scattering.

The pumping radiation is supplied through suitable isolator 12, partially transmissive obliquely oriented dichroic reflector 13, mode-matching lens 21 and partially transmissive reflector 14 of the resonator of the Raman oscillator into the $Li^6NbO_3$ Raman-active medium 15. The resonator is completed by the focusing reflector 16, which, with reflector 14, produces a confocal beam within the crystal. Reflectors 14 and 16 have dichroic reflectivity adapted to transmit the pump radiation, and to resonate the Raman scattered radiation.

To extract the back-scattered Raman radiation, which is more easily separated from the pump radiation than is the forward-scattered Raman radiation, reflector 14 has a slight (about 1) transmissivity for the Raman shifted $1.095\mu$ radiation; and the reflectivity of dichroic reflector 13 is selected to be relatively high at $1.095\mu$, as compared to its reflectivity at $1.06\mu$. Reflector 13 thus reflects the Raman-shifted radiation into a utilization apparatus 19, which may be an optical modulator in a communication system. It may readily be perceived that a plurality of similar Raman oscillators all pumped at $1.06\mu$ but providing different frequency shifts would enable multiple channel optical communication.

The pumping laser 11 is a laser employing a host crystal of yttrium aluminum garnet in which $Nd^{3+}$ ions are included substitutionally for yttrium ions. Laser 11 is illustratively operated to produce a continuous wave radiation output in order to enable continuous wave Raman lasing action in crystal 15. Further details of the illustrative pumping laser 11 may be found in J. E. Geusic et al., U.S. Pat. No. 3,252,103, issued May 17, 1966. The pumping source need not be a laser, but could instead be a source supplying band of frequencies less than the spontaneous line width of the Raman-active medium.

Isolator 12 may be an optical Faraday rotator of known type between crossed polarizers. The laser 11 is oriented to supply radiation of polarization readily passed by the first polarizer. Beyond isolator 13, the pump polarization is illustratively vertical. Any reflected pump radiation is polarization rotated in isolator 12 in a sense to be extinguished.

The dichroic reflector 13 is coated with multiple dielectric layers to have a high transmissivity at $1.06\mu$ and a high reflectivity at $1.095\mu$. Such frequency selectivity is presently commercially available in optical components.

The $Li^6NbO_3$ crystal is grown by the technique of crystal pulling from a suitable melt, such as a melt prepared from lithium carbonate and niobium pentoxide, with the modification that the lithium salt employed in the melt is, for example, $Li^6CO_3$ instead of lithium carbonate having the naturally occurring abundance of lithium isotopes. The antecedent separation of lithium isotopes typically employs well-known techniques. A seed crystal of $Li^6NbO_3$ is prepared, then inserted into the melt for a conventional crystal pulling process.

Of particular significance with respect to the composition of crystal 15 of FIG. 1 is that its optical loss is preferably less than one percent. To the extent it is desirable to shift the Curie point (the temperature at which the ferroelectric-to-paraelectric phase transition occurs), this result is preferably accomplished by substitution of anions rather than by deliberate addition of dopant impurities. Deliberate addition of dopant impurities, such as molybdenum, illustratively, for making the crystal grow single domain without poling, may be done, to the extent that the impurity concentration is less than one mole percent.

The pulled crystal of $Li^6NbO_3$ is then cut to the dimensions of crystal 15. Its length L is illustratively 15 millimeters in the $a$ crystalline axis direction; and it is 3 by 3 millimeters square cross section orthogonal to the $a$ direction. The $c$ axis is oriented to be parallel to the pump polarization. The length L is equal to the confocal parameter of the Raman-shifted radiation beam in crystal 15. The confocal parameter is the distance between two points in the optical beam at which the beam wave fronts have minimum radius of curvature. Thus, if reflectors 14 and 16 were exactly confocally spaced, they would be exactly on the ends of crystal 15. We prefer that reflectors 14 and 16 be disposed so that their spacing and alignment may be readily adjusted.

In addition, it is desirable to polish and antireflection coat the light-transmitting ends of crystal 15. The crystal ends are cut orthogonal to the $a$-axis, as compared to other feasible cuts, solely because the resulting ends may be polished to a smoother surface than the ends resulting from other cuts.

Reflectors 14 and 16 have 20 millimeter radii of curvature and are spaced at about 37 millimeters. Lens 21 is chosen and disposed to focus the pump radiation into a beam shape for which the confocal parameter is exactly the length L of crystal 15. Thus, pump and Raman-shifted beams have like confocal parameters.

The assembly of crystal 15 and its optical resonator is disposed in refrigeration apparatus 22 in order to provide tuning control, that is, variable control over the frequency of the Raman radiation as well as provide increased Raman gain, particularly for $Li^7NbO_3$.

In operation, at 300° K (Kelvin), a Raman shift of 256 cm.[11] ( 1 cm.[11] = $3 \times 10^{10}$ cycles per second) is obtained with $Li^6NbO_3$ and at 80° K (approximately liquid nitrogen temperature) the corresponding Raman shift is 266 cm[11]. The unexpected scattering cross section which we have found indicates that the pumping power lever for one percent gain per pass (before oscillation saturation) is only 20 watts at 300° K, (11 watts at 80° K). In contrast, the corresponding pumping power is nearly 40 watts for $Li^7NbO_3$ at 300° K (13 watts at 80° K), or for a crystal having a naturally occurring isotope ratio of $Li^6NbO_3$ and $Li^7NbO_3$.

We believe, without wishing to limit our invention thereto, that $Li^6NbO_3$ provides an unusual advantage due to decoupling of two of the optic phonons in $Li^6NbO_3$. No appreciable variation of scattering cross section with isotope substitution was found in $Li^7TaO_3$ because the two analogous phonons are already decoupled in this substance.

A mixture of $Li^6NbO_3$ and $Li^7NbO_3$ in a proportion greater than the 1:99 proportion, respectively, occurring in nature would be useful in a Raman oscillator shifted in frequency from that of FIG. 1 by a small but stable amount. Simultaneously, the presence of an unnaturally large proportion of $Li^6NbO_3$, because of its relatively large scattering cross section, facilitates the attainment of continuous wave laser oscillation.

Figure 2:
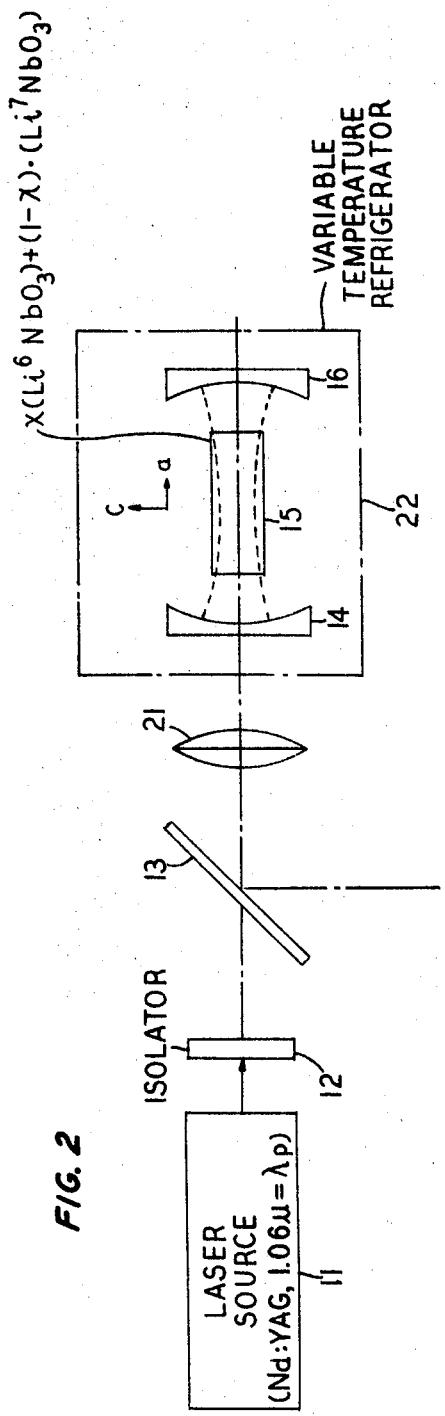
FIG. 2 is a partially pictorial and partially block diagrammatic illustration of a second embodiment of our invention employing a mixed crystal of $Li^6NbO_3$ and $Li^7NbO_3$.

A modified embodiment is shown in FIG. 2, in which the Raman-shifted wavelength, $\lambda_s$, is determined by the mixture as follows:

$$\frac{1}{\lambda_s} \simeq \frac{1}{\lambda_p} - [x \cdot \omega_R^{Li^6} + (1-x)\omega_R^{Li^7}] \quad (1)$$

where $\lambda_p$ is the pump wavelength, $x$ is the mole fraction of the material which is $Li^6NbO_3$, and the $\omega_R$'s are the respective Raman frequency shifts, which are set out in the table of FIG. 2A as a function of temperature in the apparatus 22.

The mole fraction $x$ is the range between 0.05 and 1.0, and therefore is substantially larger than the 0.01 mole fraction of $Li^6NbO_3$ that occurs in natural lithium niobate.

Other modifications of the foregoing embodiments of our invention are within its scope.

For example, the substitution of variable electric field tuning, variable-strain tuning, or tuning by rotation of the crystal for variable-temperature tuning may be accomplished in $Li^6NbO_3$. Such tuning could also supplement temperature tuning. One type of rotation tuning involves the so-called polariton, a mixed phonon-photon excitation. In this case, one changes the direction of pumping with respect to the resonator axis. The other type involves rotating the crystal within the resonator to change the phonon propagation direction with respect to the $c$-axis.

Figure 3:
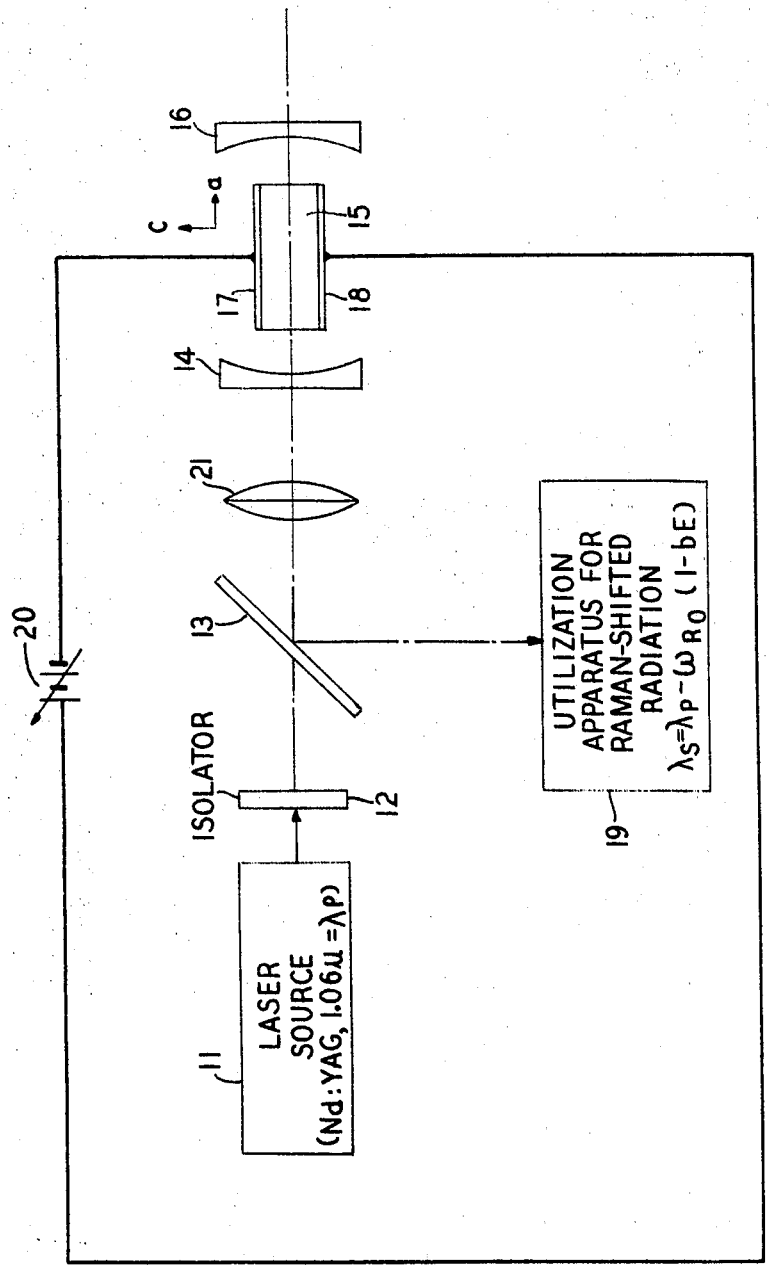
FIG. 3 is an illustration of a modification of the embodiment of FIG. 1 for electric field tuning of the Raman shifted coherent radiation.

An example of electric field tuning is shown in the embodiment of FIG. 3, in which the changes from the embodiment of FIG. 1 are the elimination of temperature-controlling apparatus 22 and the addition of a variable source 20 of DC voltage which is applied to crystal 15 through laterally disposed electrodes 17 and 18, illustratively oriented orthogonally to the $c$-axis of the crystal.

In general, the wavelength $\lambda_s$ of the Raman-shifted radiation will vary according to the following relationship:

$$\frac{1}{\lambda_x} = \left(\frac{1}{\lambda_p} - \omega_{R_0}(1-bE)\right) \quad (2)$$

where $\omega_{R_0}$ is the Raman shift in frequency in the absence of applied electric field, E, and b, is the coefficient of the variation.

With respect to electric field tuning, the embodiment of FIG. 3 represents an extension of the principles of the copending U.S. Pat. application of Messrs. P. A. Fleury, V and J. M. Worlock, Ser. No. 670,295, filed Sept. 25, 1967 and assigned to the assignee hereof. The embodiment of FIG. 3 has the characteristic advantage of our invention that the Raman-scattering cross section is large for the Raman scattering involving a Raman shift near 256 cm.[11].

It was mentioned hereinbefore that the Curie point of crystal 15 or 15' may be shifted by substitution of other anions for the $NbO_3^1$ anion. The shift of the Curie point may be advantageous for the reason that such a shift will be reflected in a shift in phonon frequency for the ferroelectric mode. Hence, partial substitutions would produce frequency selection similar to the isotope mixture frequency selection of FIG. 2.

Such substituted anions illustratively may include $TaO_3^1$ (a vanadate ion) $VO_3^1$ (a vanadate ion) not exceeding a minor portion of the crystal.

In addition, in place of a portion of the $Li^7$ in the mixed crystal 15' of FIG. 2, substituted cations such as magnesium and aluminum may be present in a mole fraction not exceeding 0.05, whether or not any anions are substituted.

In general, substituted constituents of the crystal may assume the form $R_yMO_n$, where $MO_n$ is a compound anion, M includes one or more oxidizable atoms, O is oxygen, R is a cation capable of combining into $RMO_n$, and $y$ and $n$ are combining proportions. It is preferred that the substituted crystal constituents including $Li^7NbO_3$ not exceed the mole fraction 0.95. The mole fraction of $Li^6NbO_3$ should be equal to or greater than 0.05 in order to obtain a significant increase in Raman-scattering cross section according to our invention. The other constituents are selected to form a substantially homogeneous single-crystal lattice with the $Li^6NbO_3$. It should be noted that, for example, $Li^7NbO_3$, is of the form $R_yMO_n$. In general, R and M may be any isotopic forms of the suitable elements.

We claim:

1. Apparatus for producing stimulated Raman emission, said apparatus being of the type comprising a Raman-active medium and means for supplying monochromatic pumping radiation to which said medium is substantially transparent and which is capable of exciting substantial Raman activity in said medium, said apparatus being characterized in that said medium includes a mole fraction of $Li^6NbO_3$ greater than 0.05, the remainder of said crystal consisting of molecules of the form $R_yMO_n$, where $MO_n$ is a compound anion, M is at least one oxidizable atom, o is oxygen, R is a cation capable of combining into $R_yMO_n$ and $y$ and $n$ are combining proportions, said remainder of said crystal forming a substantially homogeneous single-crystal lattice with said $Li^6NbO_3$.

2. Apparatus for producing stimulated Raman emission, said apparatus being of the type comprising Raman-active material and means for supplying monochromatic pumping radiation to which said material is substantially transparent and which is capable of exciting Raman activity in said material, said apparatus being characterized in that said material consists essentially of a mixed single crystal consisting essentially of $Li^6NbO_3$ and $Li^7NbO_3$ according to the formula, $x \cdot (Li^6NbO_3) + b1-x) \cdot (Li^7NbO_3)$ where $x$ is the mole fraction of $Li^6NbO_3$ and is equal to or greater than 0.05.

3. Apparatus for producing stimulated Raman emission, said apparatus being of the type comprising Raman-active material and means for supplying monochromatic pumping radiation to which said material is substantially transparent and which is capable of exciting Raman activity in said material, said apparatus being characterized in that said material consists essentially of a single crystal of $Li^6NbO_3$, where $Li^6$ is a lithium isotope having an atomic weight of 6.